US010392034B2

(12) United States Patent
Küter et al.

(10) Patent No.: US 10,392,034 B2
(45) Date of Patent: Aug. 27, 2019

(54) DEVICE FOR REDUCING VIBRATIONS OF A RAIL VEHICLE

(71) Applicant: Siemens AG Oesterreich, Vienna (AT)

(72) Inventors: Christian Küter, Stattegg (AT); Hugo Rackl, Stattegg (AT); Gerald Schobegger, Graz (AT); Martin Teichmann, Graz (AT)

(73) Assignee: Siemens Mobility GMBH, Munich (DE)

(*) Notice: Subject to any disclaimer, the term of this patent is extended or adjusted under 35 U.S.C. 154(b) by 248 days.

(21) Appl. No.: 15/034,936

(22) PCT Filed: Nov. 11, 2014

(86) PCT No.: PCT/EP2014/074257
§ 371 (c)(1),
(2) Date: May 6, 2016

(87) PCT Pub. No.: WO2015/071254
PCT Pub. Date: May 21, 2015

(65) Prior Publication Data

US 2016/0257318 A1 Sep. 8, 2016

(30) Foreign Application Priority Data

Nov. 13, 2013 (AT) .................................. 50757/2013

(51) Int. Cl.

| | |
|---|---|
| ***B61H 13/36*** | (2006.01) |
| ***B61F 3/02*** | (2006.01) |
| ***B61H 5/00*** | (2006.01) |
| ***F16D 55/224*** | (2006.01) |
| ***F16D 65/00*** | (2006.01) |
| ***B61F 1/00*** | (2006.01) |

(Continued)

(52) U.S. Cl.
CPC ............... *B61H 13/36* (2013.01); *B61F 1/00* (2013.01); *B61F 3/02* (2013.01); *B61H 5/00* (2013.01);
(Continued)

(58) Field of Classification Search
CPC ... B61H 13/36; B61H 5/00; B61F 1/00; B61F 3/02; F16D 55/2245; F16D 57/00;
(Continued)

(56) References Cited

U.S. PATENT DOCUMENTS

| | | | | | |
|---|---|---|---|---|---|
| 1,548,013 | A * | 7/1925 | Fowler, Jr. | B61H 13/36 188/213 |
| 2,093,797 | A * | 9/1937 | Baselt | B61H 13/24 188/207 |

(Continued)

FOREIGN PATENT DOCUMENTS

| | | |
|---|---|---|
| DE | 32 23 799 | 1/1983 |
| EP | 0 568 044 | 11/1993 |

*Primary Examiner* — Thomas W Irvin
(74) *Attorney, Agent, or Firm* — Cozen O'Connor

(57) ABSTRACT

A device for reducing vibrations of a vehicle, in particular a rail vehicle, wherein the device includes at least a vehicle frame, a brake carrier, a mechanically operative brake unit and a suspension bracket that interconnects the vehicle frame and brake carrier, where the suspension bracket includes at least one element elastically connecting the vehicle frame to the brake carrier that allows movement of the brake carrier in the transverse direction of the vehicle frame in order to dampen vibrations.

11 Claims, 2 Drawing Sheets

(51) Int. Cl.

| | |
|---|---|
| ***F16D 57/00*** | (2006.01) |
| ***F16D 65/02*** | (2006.01) |
| ***F16D 65/04*** | (2006.01) |
| ***F16F 15/02*** | (2006.01) |
| ***F16F 15/04*** | (2006.01) |
| *F16D 55/00* | (2006.01) |

(52) U.S. Cl.
CPC ......... *F16D 55/2245* (2013.01); *F16D 57/00* (2013.01); *F16D 65/0006* (2013.01); *F16D 65/0056* (2013.01); *F16D 65/0068* (2013.01); *F16D 65/02* (2013.01); *F16D 65/04* (2013.01); *F16F 15/022* (2013.01); *F16F 15/04* (2013.01); *F16D 2055/0008* (2013.01)

(58) Field of Classification Search
CPC ............. F16D 65/0006; F16D 65/0056; F16D 65/0068; F16D 65/02; F16D 65/04; F16D 15/022; F16D 15/04; F16D 2055/0008
See application file for complete search history.

(56) References Cited

U.S. PATENT DOCUMENTS

| | | | | | |
|---|---|---|---|---|---|
| 2,334,024 | A | 11/1943 | Nystrom et al. | | |
| 2,467,356 | A | 4/1949 | Eksergian | | |
| 4,211,311 | A * | 7/1980 | McMullen | B61F 3/08 | 188/209 |
| 4,744,443 | A * | 5/1988 | Brosius | B60T 1/08 | 188/292 |
| 6,279,696 | B1 * | 8/2001 | Daugherty, Jr. | B61H 1/00 | 188/209 |
| 6,305,504 | B1 * | 10/2001 | Ring | B61H 1/00 | 188/219.1 |
| 6,732,841 | B1 * | 5/2004 | Emilsson | B60T 1/04 | 188/219.6 |
| 7,527,131 | B1 * | 5/2009 | Wike | B61H 13/36 | 105/182.1 |
| 2012/0111675 | A1 * | 5/2012 | Diemling | B61F 5/32 | 188/233.7 |

* cited by examiner

DEVICE FOR REDUCING VIBRATIONS OF A RAIL VEHICLE

CROSS-REFERENCE TO RELATED APPLICATIONS

This is a U.S. national stage of application No. PCT/EP2014/074257 filed 11 Nov. 2014. Priority is claimed on Austrian Application No. A50757/2013 filed 13 Nov. 2013, the content of which is incorporated herein by reference in its entirety.

BACKGROUND OF THE INVENTION

1. Field of the Invention

The invention relates to a device for reducing vibrations of a vehicle, in particular a rail vehicle, where the device comprises at least a vehicle frame, a brake carrier of a mechanically operative brake unit and a suspension bracket that interconnects the vehicle frame and brake carrier.

In this case, particularly disk brakes and shoe brakes are regarded as mechanically operative brake units, but not magnetic rail brakes or eddy-current brakes.

2. Description of the Related Art

When rail vehicles move away on the track, vibrations in the chassis occur as a result of the wheel/rail contact, taking the form of air-borne or body-borne noise, and in the case of body-borne noise restrict the potential running speed. One of the causes of such vibrations is the conicity of the wheels of the chassis, which causes vibration of the chassis in a direction transverse to the direction of travel. As the speed of the rail vehicle increases, the frequency of the vibrations increases, whereas the damping decreases. It is therefore necessary, particularly at high speeds, to dampen such vibrations.

It is known for vibrations to be triggered in part by additional oscillating masses (absorbing masses) that oscillate in the opposite direction to the vibrations to be absorbed. The disadvantage of this is that additional masses are undesirable, because they make the chassis heavier and hence the drive power required for the vehicle would have to be increased.

SUMMARY OF THE INVENTION

It is therefore an object of the present invention to provide a device for vehicles, in particular rail vehicles, which comprises a vehicle frame and a brake unit and a suspension bracket connecting both parts which dampens chassis the vibrations.

This and other objects and advantages are achieved in accordance with the invention by a device including a suspension bracket having at least one elastic element connecting the vehicle frame to the brake carrier, and movement of the brake carrier in the transverse direction of the vehicle frame is permitted. As a result of this coupling, the brake carrier with all brake components contained therein (e.g., brake calipers, brake pads, brake shoes, etc.) is decoupled at least partially from the chassis and is utilized as an oscillating mass. Because these parts are generally manufactured from materials, such as a metal alloy or steel, a weight necessary for the absorption is ensured. The vibrational energy from transverse vibrations is absorbed by the oscillating mass, stored there temporarily and fed back in phase opposition into the arrangement to be dampened, in this case the vehicle frame. As a result, the vibrations to be absorbed are eliminated at this location wholly or at least partially. This means the maximum permitted speed of chassis, in particular also of center bogies, can be increased.

The transverse direction of the vehicle frame is the direction which, during operation of the rail vehicle, is normal to the direction of travel. The transverse direction is thus generally parallel to the longitudinal extension of the cross-supports of the vehicle frame or normal to the longitudinal extension of the longitudinal supports of the vehicle frame.

In order primarily to dampen lateral vibrations, the elastic element has a greater elasticity in the transverse direction of the vehicle frame than in the longitudinal direction of the vehicle frame. In particular, the elastic element has elasticity only in the transverse direction, and not in other directions (except for the unavoidable elasticity that every real fixed body has in any case).

The longitudinal direction of the vehicle frame is the direction which, during operation of the rail vehicle extends in the direction of travel. The longitudinal direction is thus generally parallel to the longitudinal extension of the longitudinal supports of the vehicle frame.

In an embodiment, the elastic element comprises a laminated suspension spring. In particular, the laminated suspension spring can form the elastic element by itself. So that the movement of the brake carrier occurs wholly or at least primarily in the transverse direction of the vehicle frame, the plane of the laminated suspension spring can be oriented normal to the transverse direction of the vehicle frame. By varying the length, width and thickness of the material of the laminated suspension spring, the elastic properties of the laminated suspension spring can be adjusted.

To assist the mobility of the laminated suspension spring in the transverse direction, provision can be made for the laminated suspension spring to be attached to an elastically lined bearing bush, which is mounted on a bearing bolt fixedly arranged on the vehicle frame in the direction of travel.

In another embodiment of the invention, the elastic element comprises a laminated spring. A laminated spring contains at least one layer made of an elastomer, such as rubber, and a layer made of a non-elastomer, such as sheet metal or steel. Multiple layers made of elastomer and non-elastomer can be combined to form a laminated spring. In this case, different elastomers can be used for different layers, depending on the desired property. The individual layers are generally arranged planar and parallel to one another.

So that the movement of the brake carrier occurs wholly or at least primarily in the transverse direction of the vehicle frame, the individual layers of the laminated spring can be oriented normal to the transverse direction of the vehicle frame. An even better effect can be achieved, if for each suspension bracket (therefore for each wheel of the chassis), two or more laminated springs are arranged next to one another, because both the laminated springs then work counter to one another along the connection line of the two laminated springs in the event of movements in other directions (in the direction of travel and/or in the longitudinal direction of the vehicle frame).

In another embodiment of the invention, the suspension bracket comprises a transverse pendulum and the elastic element is configured as a spring element and/or spring/damper element. A transverse pendulum is essentially a rod that is rotatably mounted about an axis in the longitudinal direction of the vehicle frame. The elasticity is ensured either only by spring elements or by combined spring/damper elements, which are then oriented in the transverse direction, so that the springs and/or dampers are expanded or compressed during a movement of the brake carrier in the transverse direction. In this case, the transverse pendulum could be articulated directly on the vehicle frame and could be connected to the brake carrier via at least one spring or spring/damper element, or the transverse pendulum could be articulated directly both on the vehicle frame and on the brake carrier, where the spring elements (or the spring/damper elements) would then also connect the vehicle frame and brake carrier to one another directly.

In yet another embodiment of the invention, the suspension bracket comprises a linear guide and the elastic element is configured as a spring element and/or spring/damper element. A linear guide is understood here to mean an element that enables as friction-free a translation as possible of the brake carrier in the transverse direction and simultaneously guarantees adherence to this direction of movement. Here, the linear guide could be attached on one side, directly to the vehicle frame and, on the other, side could be connected to the brake carrier via at least one spring or spring/damper element. Alternatively, the linear guide could be attached directly to both the vehicle frame and the brake carrier, where the spring elements (or the spring/damper elements) would then therefore directly connect the vehicle frame and brake carrier to one another. The linear guide, on the one hand, and the spring elements or spring/damper elements, on the other hand, would then be connected to one another in parallel.

Generally, a suspension bracket will contain only one type of elastic elements, so for instance only one laminated suspension spring or only one or two or more laminated springs. However, in principle combinations of different elastic elements in one suspension bracket are conceivable, thus e.g. laminated suspension springs with laminated springs.

The brake carrier can support at least one brake caliper for a disk brake, if the device in accordance with disclosed embodiments or the invention is configured for a disk brake. The disk brake is a design of brake in which the deceleration is generated by a brake disk attached to the wheel boss or the wheel axle and the brake shoe with brake pads lying in the caliper unit (brake caliper). The more brake calipers the brake carrier has, the larger the mass of the system consisting of brake carrier and brake calipers and the greater the damping.

The brake carrier can support at least one brake shoe for a shoe brake, if the inventive device is configured for a shoe brake. Shoe brakes are in part still utilized in rail vehicles. In the case of the shoe brake, a brake shoe is pressed onto the movable part to be braked either via a brake-rod linkage or via pneumatic or hydraulic devices. The brake shoe often presses directly onto the running surface of wheels, such as in the case of railroad freight cars. The brake shoe may consist not only of metal, but also of an artificial resin composite material. However, the shoe brake need not engage on the wheel, but instead could (similarly to a block brake) engage on the sleeve of a cylinder fixed to the wheel axle.

In the case of a hydrodynamic retarder (or flow brake or hydraulic flow brake) two impellers, a rotor (i.e., a rotating impeller) and a stator (i.e., a stationary impeller), are located in a housing. During braking more or less oil is pressed by the rotor, which is connected to the wheel axle, against the stationary stator. The oil is decelerated in the stator, diverted and returned to the rotor. As a result, the rotor and thus also the vehicle are braked. The whole hydrodynamic retarder would in an inventive embodiment be fixed to the brake carrier, and additionally there would be a need for a coupling that transmits the brake torque from the wheel axle to the retarder. This coupling would have to be formed elastically in the transverse direction of the chassis. A curved-tooth coupling could be used for this, for example.

In a preferred embodiment of the invention, the suspension bracket engages directly on the brake carrier and on the vehicle frame, and thus no drive units are located between brake carrier and vehicle frame. In this regard, the disclosed embodiments of the invention are suitable for center bogies, which thus do not comprise a drive. The vehicle frame then comprises not only the mechanically operative brake unit and the suspension bracket for the brake carrier thereof but also at least wheels and wheel axles.

However, the elastic element need not be connected directly to the respective parts to be connected, the vehicle frame and the brake carrier. Instead, it is possible that although the elastic element represents a connection, other components of a suspension bracket, such as fastening plates or articulations or other intermediate elements, are present between the elastic element and the parts to be connected.

Generally, the suspension bracket can have, in addition to the elastic element, a damper element that dampens the vibrations of the elastic element, such as a piston guided on a piston rod in an oil-filled cylinder.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention reference is made in the following part of the description to the figures, from which further advantageous embodiments, details and developments of the invention can be taken, in which.

DETAILED DESCRIPTION OF THE EXEMPLARY EMBODIMENTS

Figure 1:
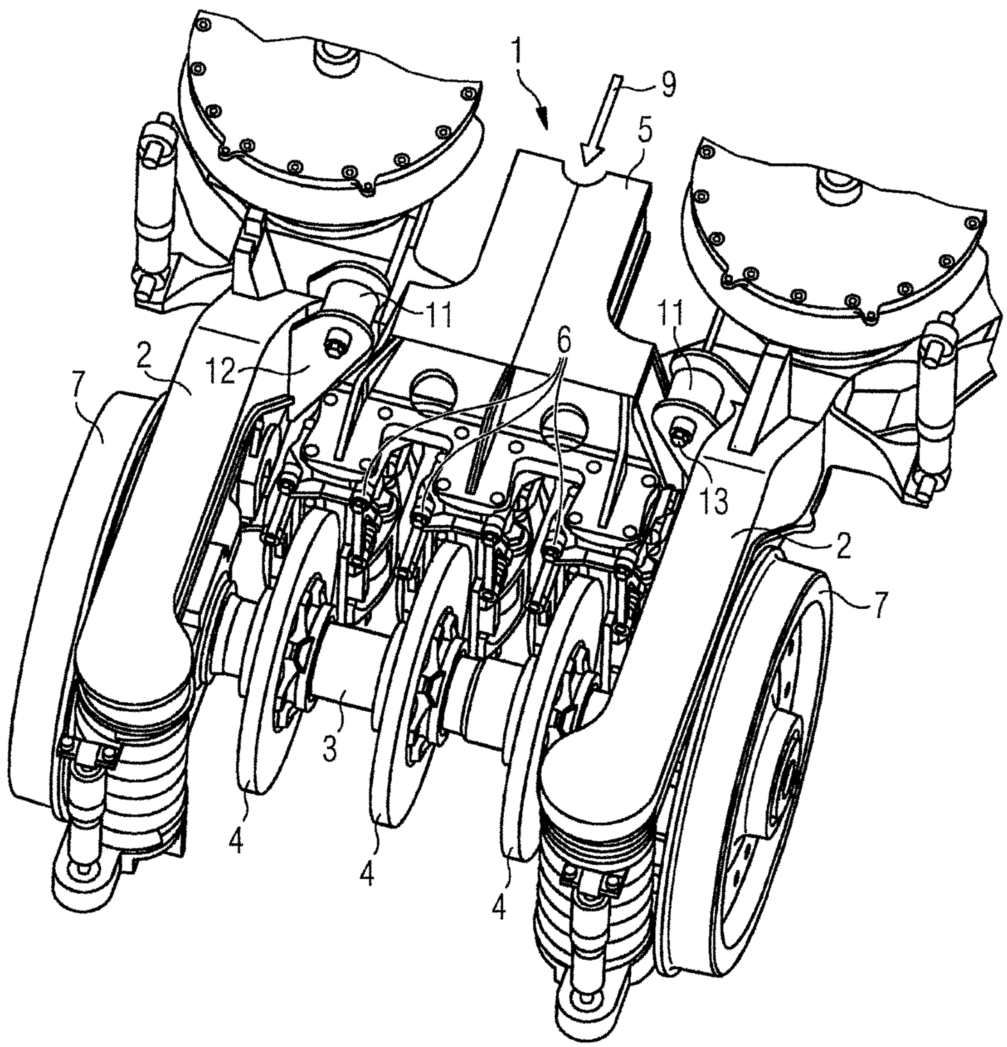
FIG. 1 shows an axonometric view of a section of an device with brake carrier and brake caliper units in accordance with the invention.

FIG. 1 shows a disk brake 1, which is arranged on the vehicle frame between the longitudinal supports 2 thereof. A disk brake 1 consists of one or in this case several brake disks 4 connected to the wheel axle 3, and of the brake carrier 5, to which the (in this case three) brake calipers 6, which are also called a caliper unit, are attached. A respective brake caliper 6 encompasses a respective brake disk 4, and on each side of the brake disk 4 contains brake pads and the brake pistons, which press the brake pads axially against the brake disk 4.

FIG. 1 illustrates only half the chassis, where the entire chassis comprises two wheel axles 3 parallel to one another, each with two wheels 7. The second half (not illustrated) of the chassis is designed to be symmetrical to the half illustrated. The brake carrier 5 thus likewise continues symmetrically and hence has six brake calipers 6 in total. The device in accordance with the invention can, however, also be formed precisely as illustrated here, in that the brake carrier 5 ends in the center of the chassis and only has brake calipers 6 for the brake disks 4 of one wheel axle 3.

In this exemplary embodiment, the suspension bracket of the brake carrier 5 has two laminated suspension springs 8 fixed to the vehicle frame (on the longitudinal supports 2), one on each side of the brake carrier. The laminated suspension springs 8 are generally manufactured from steel. This is more readily apparent in FIG. 2, because the longitudinal supports 2 and the wheels 7 are not illustrated there. Provided on each longitudinal side of the brake carrier 5 per wheel axle is a laminated suspension spring 8, the surface of which is oriented in parallel to the direction of travel 9. In this case, the laminated suspension spring 8 has, in its longitudinal direction, a larger component in the direction of the vertical axis of the chassis (normal to the direction of travel 9 and to the wheel axles 3) than in the transverse direction of the chassis (parallel to the wheel axle 3). In the case in point, the laminated suspension spring is oriented in parallel to the vertical axis, in other words perpendicular in the operating state of the chassis.

Figure 2:
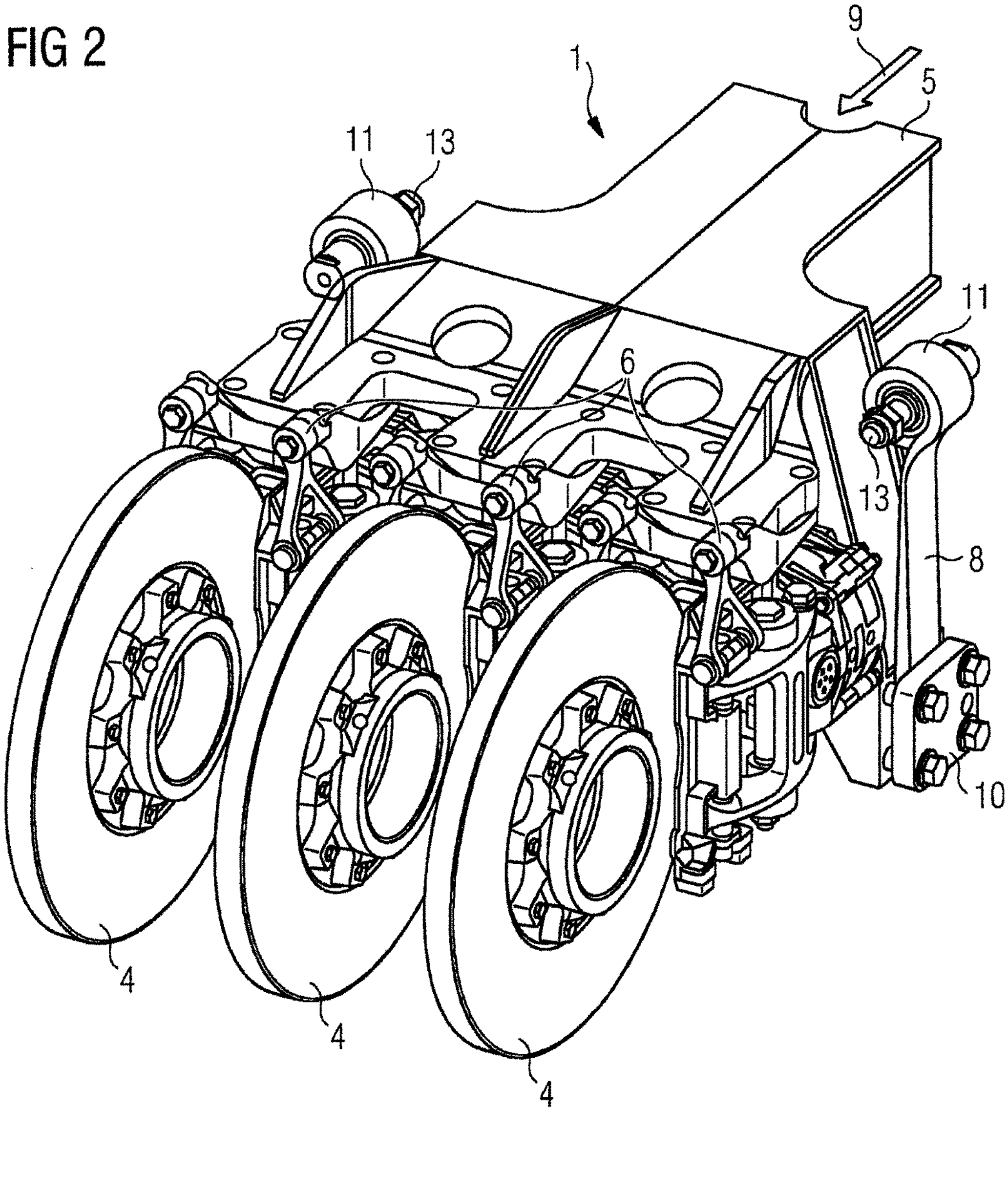
FIG. 2 shows the device of FIG. 1 without a vehicle frame.

The laminated suspension spring 8 is attached at one end to the brake carrier 5 via a plate 10. By the other end, it is attached to a bearing bush 11 that is lined inside with an elastic material and via this elastic material is connected to the vehicle frame, such as by a bolt, which is mounted in a bracket 12, where the bracket 12 is fixedly connected to the vehicle frame (in this case the respective longitudinal support 2). The bearing bushes 11 are, in this case, oriented in the direction of travel 9. The elastic lining of the bearing bush 11 causes the transverse rigidity of the laminated suspension spring 8 to be reduced. The two laminated suspension springs 8 drawn in FIG. 2 are arranged symmetrically to one another with respect to the direction of travel 9.

The brake carrier 5 with the brake calipers 6 can now oscillate about the bearing bolts 13 transversely to the direction of travel 9, and as an oscillating mass can absorb undesirable vibrations.

If the brake carrier 5 continues symmetrically in the longitudinal direction of the vehicle frame, its suspension bracket then has a total of four laminated suspension springs 8.

For all contemplated embodiments, it should be understood that the rigidity and the damping of the elastic elements in the transverse direction of the vehicle frame can be aligned to the mass of the corresponding brake carriers together with brake components fixed thereto and the chassis. The necessary elasticity or rigidity of the inventive elastic elements is hence calculated beforehand and the elastic elements are manufactured with defined elasticity, in particular transverse elasticity, or rigidity. The aim is to improve the running properties of the chassis with respect to vibrations.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for reducing vibrations of a vehicle, comprising:

at least a vehicle frame;

a brake carrier of a mechanically operative brake unit; and a suspension bracket interconnecting the at least one vehicle frame and the brake carrier and including at least one laminated suspension spring forming an elastic element connecting the at least one vehicle frame to the brake carrier, and which permits movement of the brake carrier in a transverse direction of the vehicle frame;

wherein the elastic element has a greater elasticity in the transverse direction of the vehicle frame than in the longitudinal direction of the vehicle frame.

2. The device as claimed in claim 1, wherein the laminated suspension spring is attached to an elastically lined bearing bush, which is mounted on a bearing bolt fixedly connected to the vehicle frame in a direction of travel.

3. The device as claimed in claim 1, wherein the suspension bracket comprises a transverse pendulum and the elastic element is configured as a spring/damper element.

4. The device as claimed in claim 1, wherein the suspension bracket comprises a linear guide and the elastic element is configured as a spring/damper element.

5. The device as claimed in claim 1, wherein the brake carrier supports at least one brake caliper for a disk brake.

6. The device as claimed in claim 1, wherein the brake carrier supports at least one brake shoe for a shoe brake.

7. The device as claimed in claim 1, wherein the brake carrier supports at least one hydrodynamic retarder.

8. The device as claimed in claim 1, wherein the suspension bracket engages directly with the brake carrier and the vehicle frame.

9. The device as claimed in claim 1, wherein the suspension bracket includes a damper element.

10. The device as claimed in claim 1, further comprising:

at least wheels and wheel axles for formation of a center bogie.

11. The device for reducing vibrations of a vehicle is claimed in claim 1, wherein the vehicle is a rail vehicle.

* * * * *